(No Model.)
J. RIGBY.
CAR WHEEL.
No. 406,853. Patented July 9, 1889.
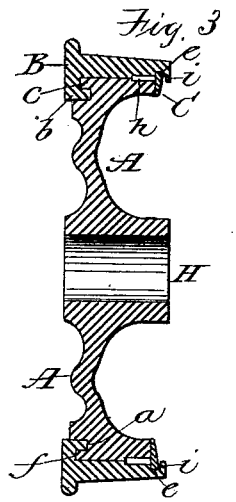
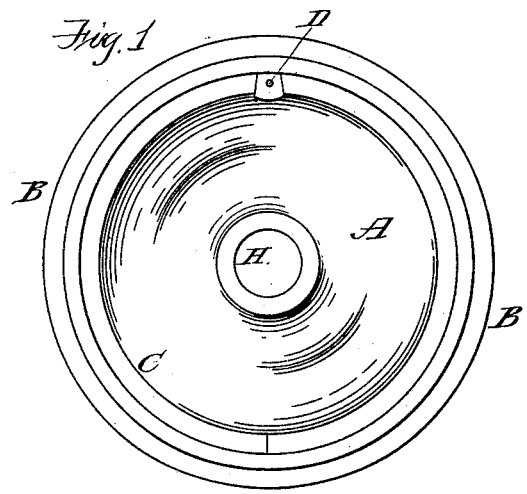
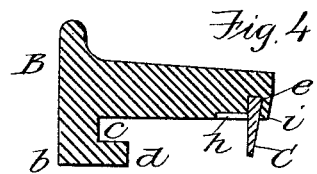
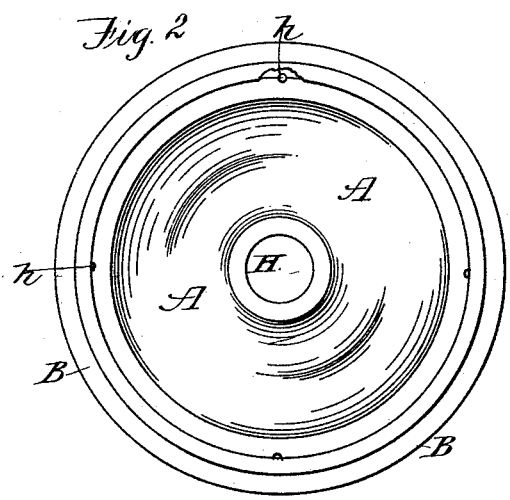
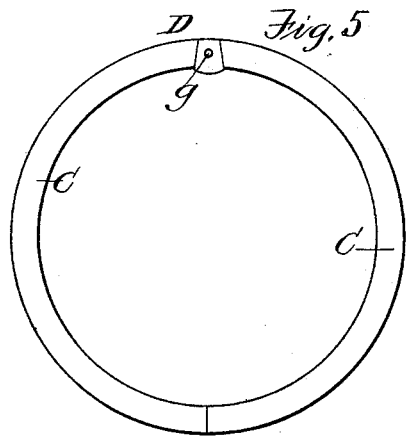
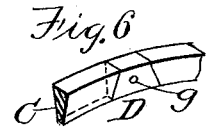
Witnesses
Jas. W. Ingalam
B. F. Snyder
Inventor
James Rigby
By E. B. Clark
Atty.

UNITED STATES PATENT OFFICE.

JAMES RIGBY, OF MINNEAPOLIS, ASSIGNOR TO THE RIGBY CAR WHEEL COMPANY, OF ST. PAUL, MINNESOTA.

CAR-WHEEL.

SPECIFICATION forming part of Letters Patent No. 406,853, dated July 9, 1889.

Application filed October 9, 1886. Renewed December 28, 1888. Serial No. 294,847. (No model.)

*To all whom it may concern:*

Be it known that I, JAMES RIGBY, a citizen of the United States, residing at Minneapolis, in the county of Hennepin and State of Minnesota, have invented certain new and useful Improvements in Car-Wheels; and I do hereby declare the following to be a full, clear, and exact description of the invention, such as will enable others skilled in the art to which it appertains to make and use the same.

This invention relates to car-wheels in which the web or body and the tire are made in separate parts and secured together by simple and effective devices, hereinafter described.

The object of my invention is to provide improved means for securing the tire to the web or body of the wheel which shall be more simple and effective than the devices now in use; and more particularly the object is to provide a tire and body composed of steel or wrought-iron and aluminium mixed in suitable proportions in the molten state, whereby greater tensile strength and malleability of the metal are secured, so that a flanged portion of the tire may be readily hammered down over the outer thick periphery of a beveled spring locking-ring and snugly embrace such ring, and thus effectually secure the tire to the body of the wheel. The tire, or tire and body, made of steel and aluminium, or of wrought-iron and aluminium mixed in suitable proportions, and having a suitable groove and lip or flange, and the beveled spring locking-ring, made thick at its outer periphery and tapering to a thin edge at its inner periphery, so as to be wedge-shaped or triangular in cross-section, are the important and distinguishing features of this invention.

I will now more particularly describe my invention by reference to the accompanying drawings, in which—

Figure 1 represents an elevation showing the outer face of my complete car-wheel with the locking-ring and wedge in position. Fig. 2 represents a similar view with the beveled spring arc or ring removed for showing the holes bored to receive screw bolts or pins. Fig. 3 represents a vertical diametrical section of the wheel. Fig. 4 represents a cross-section of the tire and a cross-section of the beveled locking-ring in position with flange $i$ hammered down upon the ring. Fig. 5 represents a face view of my beveled spring locking-ring in two arcs or sections for locking the tire and web of the wheel together, also the wedge-shaped key in position. Fig. 6 represents a perspective detail view showing a portion of the beveled locking-ring and the wedge-shaped key.

Like letters refer to similar parts in the several views of the drawings.

The web or body A of the wheel is provided on its inner face near its periphery with an annular groove $a$ and an annular shoulder or bead $f$, and at the center with the usual hub and axle-opening H. The tire or tread of the wheel B is provided at its inner face with the inwardly-extending flange $b$, in which is formed on its inner face the annular groove $c$ and annular shoulder or bead $d$, projecting horizontally or at right angles to the face of the tire and flange $b$, as clearly shown in Fig. 4. An annular groove $e$ is formed in the inner periphery of the tire near its outer face, and on the outside of this groove there projects downward and inward the lip or flange $i$, which is hammered down upon and embraces the inwardly-beveled spring locking-ring C.

The locking-ring C is made thick at its outer periphery and tapers to a thin edge at its inner periphery, so as to be wedge-shaped or triangular in cross-section, with the acute angle at its inner periphery, as shown in Figs. 4 and 6.

The ring is preferably made with its inner face flat and with its outer face beveled from the thick outer periphery down to the thin-edged inner periphery. In Fig. 3 the flange or lip $i$ is shown as projecting straight inwardly, as it is at first formed and before being hammered down, while in Fig. 4 it is shown in the position it will occupy after being hammered down and made to embrace the beveled locking-ring C. A wedge-shaped key D, conforming in cross-section to the shape of ring C, is provided for forcing the spring arcs or sections of ring C into its groove or recess $e$ in the tire and hold the same in place, a rivet $g$ being used to secure such key in position. The tire, after formation in the rough condition, is placed in a lathe and turned so as to form the flange $b$, and upon the inside of this is cut the annular groove $c$, forming the annular bead or flange $d$, of suitable dimensions to fit into the annular groove $a$ in the body A. The groove $a$ is cut into the inner face of the web or body, so as to form the annular bead $f$, of proper dimensions to fit into the groove C in the tire, as shown in Fig. 3. There is sufficient difference in size between either shoulder and groove to permit expansion and contraction of the metal. The grooves and beads are formed with round corners to prevent them from cutting each other. The annular groove $e$ is also cut into the tire, but preferably after the tire is placed upon the body of the wheel, in order to secure a neater and better fit of the parts. This groove is cut sufficiently deep (about three-eighths of an inch) to receive and retain the spring-arc C.

The tire having been properly fitted and shrunk upon the web or body A, holes $h\,h$ (two or more) are bored into them at the joint between the two and are screw-threaded, and then steel screw-bolts are screwed into them for the purpose of preventing the tire from turning upon the web or body in case such tire should expand and become loose on the body of the wheel. The spring locking-ring C when in position covers the ends of the screw-bolts and prevents them from working out.

The spring locking-ring C is preferably made in two sections and is composed of the finest quality of spring-steel. It is made from one-half to one inch thick at its outer periphery, and is beveled on its outer face inward to the inward periphery, where it is reduced nearly to an edge, and it is about one and one-half inch wide.

After the tire is placed upon and fitted to the body of the wheel and the screw-bolts $g$ placed in position, the beveled spring-arcs of ring C are sprung under pressure into the annular groove $e$ in the tire, to which it is fitted. Then the wedge-shaped key D, having a rivet-hole, is forced by a powerful screw into position between the beveled ends of the spring locking-ring, thus spreading the latter and forcing it snugly into its groove $e$. While the key is held in position by the screw a hole is bored through the tire and body on a line with the hole in the key, and a rivet is inserted and the key thus secured in place. The locking-ring C and key D having been secured in position, a Bunsen or blow-pipe flame is applied to the lip or flange $i$ till it is heated to the proper working-heat, (a lively red,) when it is hammered down upon the beveled locking-ring (see Fig. 4) and made to snugly embrace and secure it in place. As the lip or flange cools, it shrinks tightly upon the locking-ring, so as to form a solid immovable joint. With this construction there are no bolts or rivets to work loose and imperil the strength of the wheel or require frequent repair. The parts are perfectly and neatly secured and cannot get out of order in the ordinary use of the wheel.

The scrap or other form of wrought-iron or steel is preferably melted in my improved hydrocarbon-furnace, and during the operation of melting, or when the metal is at or near the molten state, a small per cent. of aluminium, or an alloy of iron aluminium, is added and incorporated with it. The metal then quickly becomes fluid, as the smelting-point of the mixture is lower than that of the iron or steel alone, and is in the best condition for casting. The bodies of the wheels are cast direct in suitable molds, and are then worked up in suitable dies, according to my improved process, which it is not necessary to describe here in detail. The tires are also formed of the mixed iron or steel and aluminium, and the mixed molten metal may be cast into blanks, from which the tire is rolled and hammered into shape and to the desired size, or the tires may be cast in molds and then worked up in dies. By the incorporation of aluminium with the iron or steel its melting-point is lowered and the metal is made more malleable, while its tensile strength is greatly increased. On account of the lowered melting-point, a sharper and better casting may be obtained, and also, owing to this quality and the improved malleability, the tire and body may be much better worked up in the dies.

The lip or flange $i$, which is made to overlap the beveled locking-ring C, can be heated and worked at a lower temperature, and owing to its improved malleability can be hammered down without break or crack, and when finished will present a smooth, clean, and strong appearance, and its tensile strength is such that it will firmly embrace and hold the ring and wedge-shaped key in place without yielding or loosening under the ordinary wear of the wheel.

I am aware that it has heretofore been proposed to make an alloy of wrought-iron or steel and aluminium for small castings; but car-wheels or car-wheel tires have never before, to my knowledge, been formed of a mixture of wrought-iron or steel with aluminium, and I have discovered that when the tire is formed of such a mixture and provided with a groove and lip or flange near one edge such lip or flange may be much better and more neatly hammered down over the beveled spring locking-ring, and improved results secured on account of the increased malleability and tensile strength of the metal. It is seen, therefore, that the aluminium is an important feature in my improved construction of car-wheels.

A spring locking-ring has heretofore been proposed for securing the tire or band to the body of the wheel, but no ring has been used or described having the construction and adaptation of my improved ring herein specifically described and claimed.

Having described my invention, what I claim, and desire to secure by Letters Patent, is—

In combination with the body of a car-wheel, the tire formed of steel or wrought-iron mixed with aluminium and having a groove and inwardly-projecting lip or flange at one edge or face, and a beveled spring locking ring or arc formed with a thick or broad outer periphery and a thin inner periphery, whereby said lip may be hammered down and forced to embrace the thick periphery of the beveled ring for the purpose of securing the body and tire together, as described.

In testimony whereof I affix my signature in presence of two witnesses.

JAMES RIGBY.

Witnesses:
 H. J. GROSS,
 ANDREW PARKER.